G. R. WATSON.
PHOTOGRAPHIC DUPLICATING AND ENLARGING APPARATUS.
APPLICATION FILED NOV. 14, 1913.
1,204,098.
Patented Nov. 7, 1916.
4 SHEETS—SHEET 1.
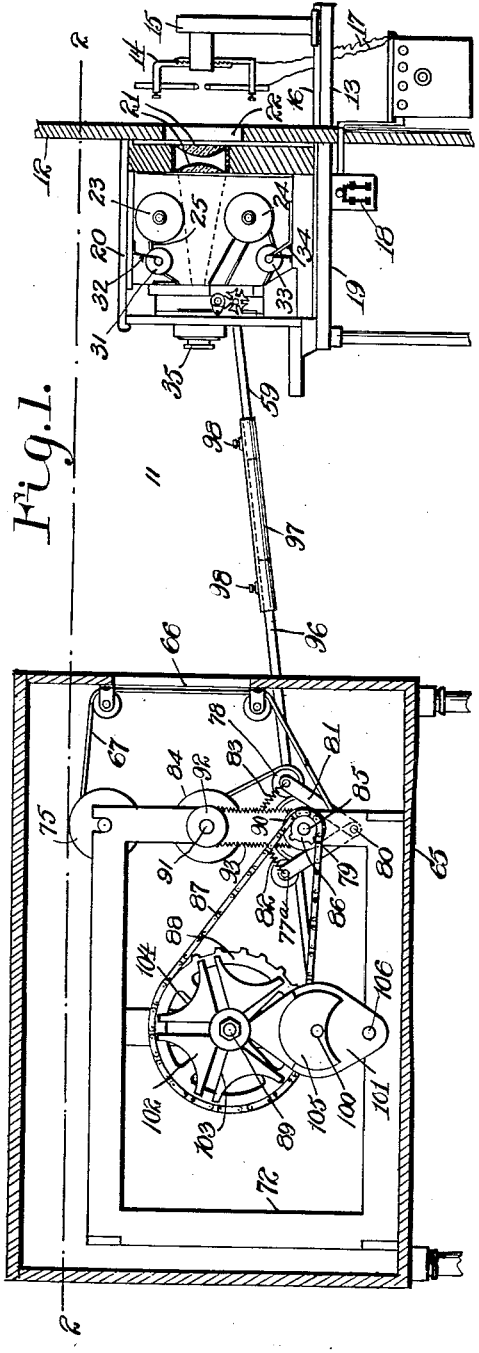
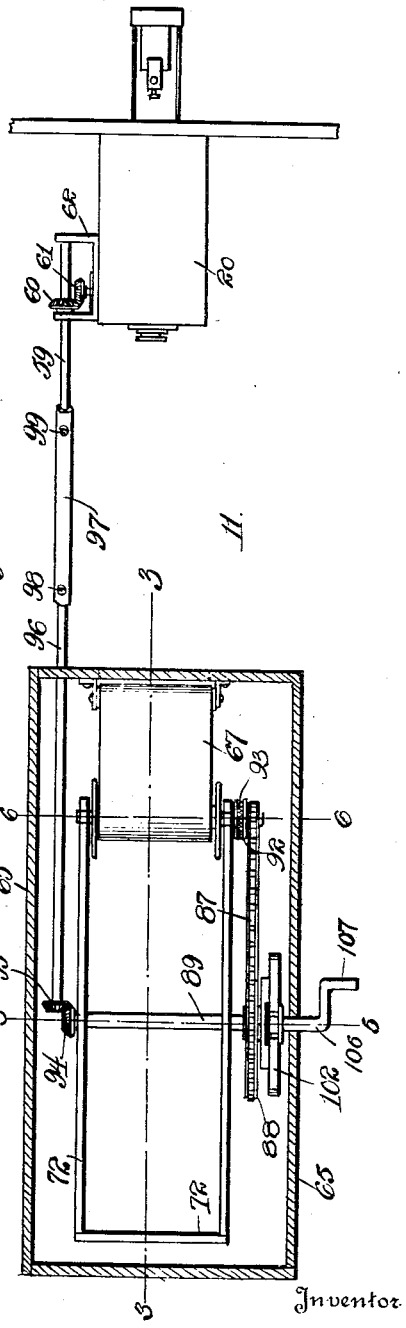
Witnesses
Wm. H. Mulligan
C. H. Crawford
Inventor
George R. Watson
By Richard Bowen
his Attorney

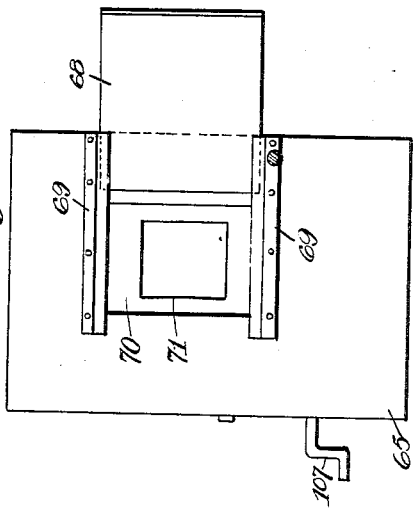

G. R. WATSON.
PHOTOGRAPHIC DUPLICATING AND ENLARGING APPARATUS.
APPLICATION FILED NOV. 14, 1913.
1,204,098.
Patented Nov. 7, 191
4 SHEETS—SHEET 3.
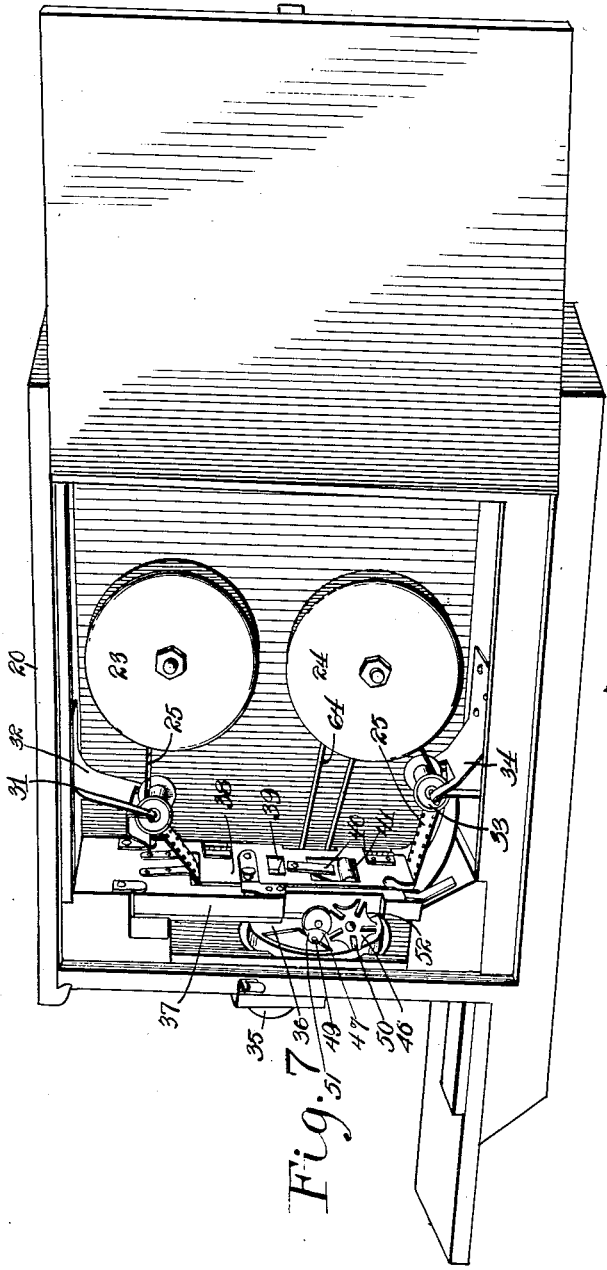
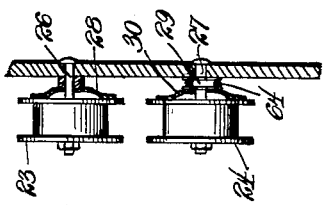
Fig. 8.
Witnesses
Wm H. Mulligan.
C. H. Crawford
Inventor
George R. Watson,
By
Robert Bowen,
his Attorney G. R. WATSON.
PHOTOGRAPHIC DUPLICATING AND ENLARGING APPARATUS.
APPLICATION FILED NOV. 14, 1913.
1,204,098.
Patented Nov. 7, 1916.
4 SHEETS—SHEET 4.
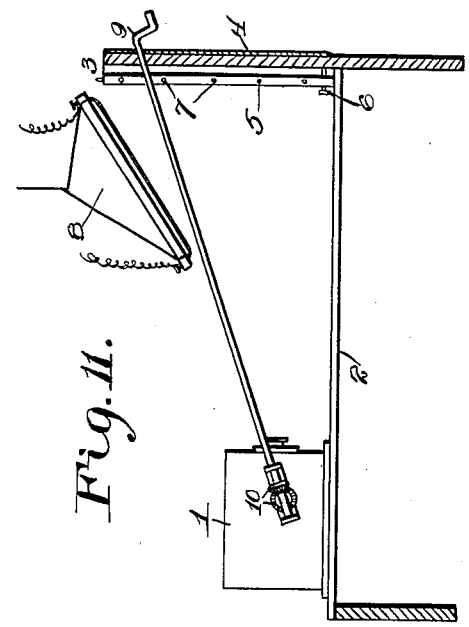
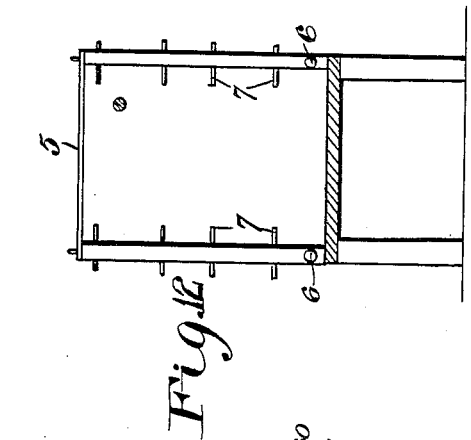
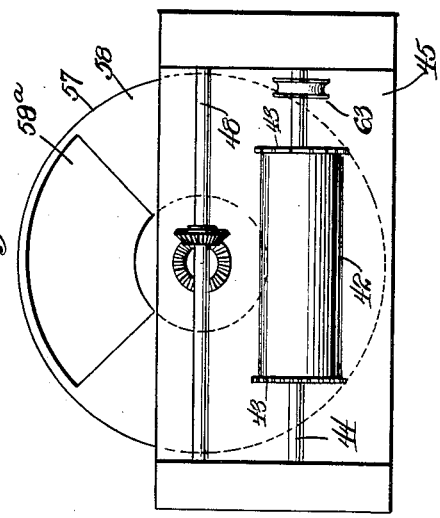
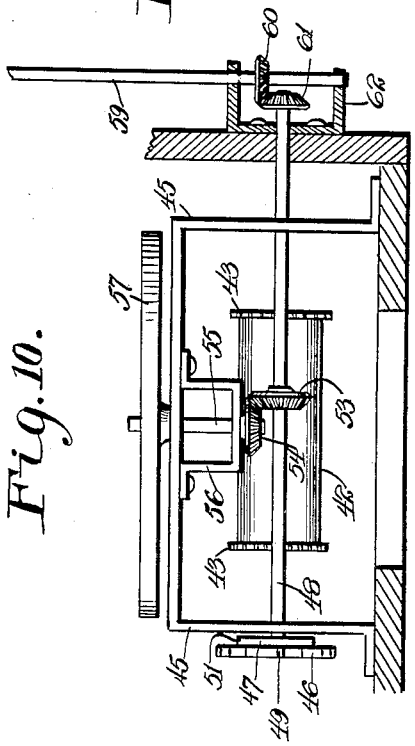

UNITED STATES PATENT OFFICE.

GEORGE R. WATSON, OF PORTLAND, OREGON.

PHOTOGRAPHIC DUPLICATING AND ENLARGING APPARATUS.

1,204,098.　　　　Specification of Letters Patent.　　Patented Nov. 7, 1916.

Application filed November 14, 1913. Serial No. 801,088.

*To all whom it may concern:*

Be it known that I, GEORGE R. WATSON, citizen of the United States, residing at Portland, in the county of Multnomah and State of Oregon, have invented certain new and useful Improvements in Photographic Duplicating and Enlarging Apparatus, of which the following is a specification.

This invention has for its object the provision of a duplicating and enlarging apparatus for photographically reproducing and duplicating records and documents such as letters, maps, drawings, etc.

A further object of my invention is to provide a reproducing camera having an exposing opening, preferably variable, means for moving a ribbon of sensitized surface across said exposing opening, and means for marking on said ribbon, relatively to said exposing opening, the dividing line between the adjacent pictures photographed on said ribbon in order that the ribbon may be cut as convenient for finishing the photographing process, or otherwise. Said marking is conveniently attained by transversely perforating said ribbon along said dividing line.

A further object of my invention is so to arrange my apparatus that its operation of advancing the negative film and the sensitized ribbon producing the positive in synchronism, is performed at the reproducing camera, since such is more convenient for the operator; and to make the means employed for transmitting the motion from the reproducing camera to the projecting camera adapted to be readily disconnected, so that the reproducing camera may be operated independently of the projecting camera, when it is desired to make a number of positives from any one negative.

Further objects of the invention will be more fully described in connection with the accompanying drawings and will be more particularly pointed out in and by the appended claims.

In the drawings: Figure 1 is a vertical longitudinal sectional view of an exposing or projecting camera and the enlarging or reproducing camera of my apparatus. Fig. 2 is a horizontal sectional view on line 2—2 of Fig. 1. Fig. 3 is a sectional view on line 3—3 of Fig. 2. Fig. 4 is a front view of the enlarging case. Fig. 5 is a sectional view on line 5—5 of Fig. 2. Fig. 6 is a sectional view on line 6—6 of Fig. 2. Fig. 7 is a perspective view of the exposing camera showing one side thereof open to illustrate interior mechanism. Fig. 8 is a sectional view of the film reels of the exposing camera. Fig. 9 is a face view of the shutter and a film advancer. Fig. 10 is a plan sectional view thereof. Fig. 11 is a view in elevation with parts in section of the mechanism for marking the negative film; and Fig. 12 is a front elevation with parts in section agreeing with Fig. 11.

Like characters of reference designate similar parts throughout the different figures of the drawings.

I will first briefly refer to the initial strip which consists in photographing records upon a film, as shown more particularly in Figs. 11 and 12. 1 designates a taking camera which is shown mounted upon a support 2 for location at proper focal distance from the holder device 3 in which the record to be photographed is positioned. The holder device 3 may consist of a backing 4 and a frame 5. The frame 5 may be provided with adjusting means 6 and spring clamps 7, the latter functioning to hold the record to be photographed against the backing 4. Any suitable source of supply of light may be provided as diagrammatically indicated at 8. Means are provided for advancing the film in the camera 1 and such means may comprise an operating crank 9 having suitable gear connection 10 with the film reels of the camera so that upon one complete rotation of the crank an exposure will be made and the film advanced for a new exposure.

Referring now to Figs. 1 and 2, and more particularly to the exposing or projecting camera, 11 designates a dark room which is partitioned off by a wall 12 and on one side of the wall I provide a light support 13. In the present disclosure I have shown an arc light 14 which is mounted upon an arc holder 15 adapted to be slidably adjusted on a rail 16 toward and from the wall 12. Suitable electrical connections 17 and a switch 18 may be provided but the same are only generally indicated, as they form no part of the present invention.

In the dark room 11 a support 19 is provided for the projecting camera which latter is indicated as a whole at 20. In the rear wall of said camera I provide condensing lenses 21 adjacent an opening 22 in the wall 12, for projection of the rays of light from the arc therethrough on to the film to be exposed. In the camera 20 are mounted supply and take-up film reels 23 and 24, respectively, for the photographic film 25.

In Fig. 8 I have shown spindles 26 and 27 on which reels 23 and 24 are mounted. A leaf spring drag 28 is provided for the supply reel 23 and I provide means for imparting rotation to the take-up reel 24 which may consist of the following construction:—A pulley 29 is loosely mounted on the spindle 27 and is secured to a leaf spring 30 which bears against reel 24, the latter also being loose on spindle 27. As the pulley 29 is revolved it will frictionally rotate the reel 24 to take up slack in the film 25 for a purpose which will presently appear.

The film 25 is trained over a guide roller 31 in its passage to an exposing position, and the guide roller 31 is suitably journaled in a bearing 32. Likewise the film 25 is trained about a guide roller 33 in its passage toward the take-up reel 24. See Fig. 7. The roller 33 is provided with a mounting indicated at 34.

The lens of the camera is indicated at 35 and a shutter is shown at 36. The film 25 is passed through a guide indicated generally at 37 and which is provided with a door 38. The door 38 is provided with a suitable opening 39 through which the rays of light pass from the arc 14. A spring 40 serves to hold a roller 41 against the film 25 to hold the latter against a sprocket film advancer indicated at 42 in Figs. 9 and 10, the film 25 having sprocket openings in the margins thereof for engagement with sprocket teeth 43, of the film advancer. Within the film guide 37 any suitable means may be provided for holding the film in proper position for exposure, but as such means does not constitute a part of my invention the same is not illustrated.

The film advancing sprocket or roller 42 is mounted on a shaft 44 which is journaled in a bracket 45, suitably supported in the interior of the camera. One member, which may be the driven member or radially slotted cross 46 of a Geneva movement is mounted upon shaft 44 and the cam or actuating member of the movement 47 is mounted on a shaft 48, the latter being journaled in the bracket 45. The Geneva movement, for the camera operates in the usual manner so that when the pin 49 of the actuating member 47 enters one of the slots 50 of the actuated or driven member 46 the roller 42 will be advanced, and when the cam portion 51 of the actuating or driving member 47 of the Geneva movement enters one of the arc recesses 52, the shaft 44 will then be locked. The shaft 48 is provided with a gear 53 (see Fig. 10) which meshes with a gear 54 on a shutter shaft 55, which latter is suitably journaled in brackets 45 and 56. The shutter shaft 55 carries a shutter 57 having an opaque portion 58 and an opening 58ª as shown in Fig. 9. This shaft 59 will be connected with shaft 48 by gears 60 and 61, the shaft 59 being journaled in bearings formed on a bracket 62. It will thus be seen that the film and shutter are operated from the same mechanism so that the relation of the movement of the shutter with respect to the advancement of the film can be regulated, as will hereinafter more fully appear.

In order to rotate the take-up reel 24 to take up film slack as a result of advancing movement of the film 25 by the sprocket roller 42, I provide on the shaft 44 a pulley 63, which is belted as indicated at 64, to the pulley 29, as will be readily seen by reference to Figs. 7, 8 and 9.

I will next refer to the reproducing apparatus which is shown more particularly in Figs. 1 to 6. A case 65 is provided with an exposure opening 66 adapted for disposition in the desired projection scope or range with respect to the camera 20. A bromid strip or film 67 is adapted to be advanced abreast of the exposure opening 66, by means hereinafter described. An imperforate black slide 68 is mounted in suitable guides 69 and is adapted to be shifted in the guide 69 to either cover or expose the opening 66. An exposing black slide 70 is slidable in the guides 69 back of the imperforate black slide 68 and is of a size suitable for certain enlargements. Any desired number of exposing slides 70 may be provided with different sizes of exposing openings 71 and these slides may be substituted, the one for the other, when the black slide 68 is in a closed position. I have not thought it necessary to indicate any light proof or tight strips or fittings as these are structural matters clearly within the skill of anyone conversant with this art.

Within the case 65 I provide a frame 72 on which are mounted a plurality of spouts and rollers for guiding the bromid strip 67, and also the means for operating the same. Positioning rollers 73 and 74 are shown mounted on the case 65 to maintain the bromid strip 67 abreast of the exposing opening 66. A supply spool 75 is mounted in the frame 72 and when the case is to be loaded, the entire supply of the bromid strip is on the supply spool 75. The end of the strip 67 will be trained over rollers 73 and 74, and therefrom to a spacing and advancing roller 76. This roller will be provided with pins 77 for perforating the strip 66 so that the same may be severed at the juncture of or between adjacent units of prints or reproductions thereon. Spacing or perforating rollers 76 of different diameters will be employed in order that the circumference of the spacing roller 76, in use, will equal the height of the exposing opening 71 in the black slide 70. When a black slide is used with a larger or smaller opening a perforating or spacing roller of a corresponding diameter or circumference will be used. The bromid strip 67 will be trained about the roller 76 between pressure rollers 77ª and 78. As shown in Fig. 1 the pressure roller 77ª is shown mounted upon arms 79, one only of which is shown, and which is pivoted at 80 upon the frame 72. Pressure roller 78 is mounted in similar arms, only one of which is shown at 81, and such arms are pivotally mounted at 80. Springs 82 and 83 hold the pressure rollers in engagement with the spacing roller 76. The strip 67 is trained over spacing roller 78 to a take-up spool 84 which is suitably slotted to receive the end of the strip, in starting the same.

On the outer end of the spindle 85 of the spacing roller 76, I mount a sprocket wheel 86 over which a sprocket chain 87 is trained, the chain 87 being also trained about a sprocket wheel 88 on a shaft 89, suitably journaled in the frame 72. Inside of the sprocket wheel 86 I mount a pulley 90, which is suitably fixed to the spindle 85, and on a spindle 91 of the take-up spool 84, I mount a pulley 92. A spring belt 93 is trained about pulleys 90 and 92 to yieldingly or frictionally revolve spool 84 to take up slack in the strip 67. On one end of a crank shaft 100 I mount a bevel gear 94 adapted to mesh with bevel gear 95 on shaft 96. Shafts 96 and 59 are adjustably connected preferably by means of a sleeve 97 having set screws 98 and 99, one for fastening the shaft 96 and the other for fastening shaft 59. This adjustable connection not only provides for the desired adjustment of the camera and enlargment case with respect to focal range, but it also provides for rotative adjustment of the sleeve with respect to the shafts 96 and 59 so as to accurately time the movement of the reproducing mechanism with the projecting camera mechanism.

I will next describe the manner in which the bromid strip and the film are advanced in predetermined relation with respect to each other. The shafts 89 and 100 are operatively connected by means such as a Geneva movement, the driving member 101 being mounted on the shaft 100. The driving member consists of a Geneva cross having radial slots 103 and arcuate peripheral portions 104. The driving member comprises a locking cam 105 for coaction with the arcuate portions 104 and a pin 106 for engagement with the radial slots 103. The shaft 100 terminates in a crank 107 disposed exteriorly of the case 65.

The sprocket wheel 88 will have five times the number of teeth of sprocket wheel 86, and with this proportion together with the proper sized spacing roller 76 the strip 67 will be advanced so as to move its exposed surface beyond the opening 66 and an unprinted surface abreast of the opening 66 upon one complete rotation of the crank 107.

It has heretofore been explained how rotation will be imparted to the advancing roller 42 through shafts 96 and 59 and the gear arrangement is such that when the bromid strip 67 has been advanced, as before stated, the film 25 will be advanced to move one of its photographic sections out of exposing proximity to the lens 35 and a following photographic section into exposing range with said means. This transmission will also serve to rotate the shutter 57 to advance the opening 59 from a position in registry with the lens 35 and bring the opaque portion 58 abreast of the lens 35.

It will be readily understood that opaque portion 58 must be advanced in front of the film before a new photographic section thereof is brought into registry with the lens 35 and it will be seen that the driving member 47 of the camera Geneva movement, which is mounted on shaft 48, will rotate a considerable distance prior to the time that its pin 49 engages one of the slots 50 and thus it will be seen that the opaque portion 58 will be advanced in front of the film before the film itself is advanced. It will thus be seen that successive reproductions or enlargements may be rapidly made by printing exposures from the photographic sections of the film 25 on to the bromid strip 67, in rapid succession and with absolute accuracy as regards the advancing movements of the strip and film.

Should it be desired to make a number of reproductions from one photographic section or picture on the film 25, the shafts 59 and 96 will be connected and the crank 107 will be rotated so that at each printing exposure the strip 67 would be advanced to a predetermined extent. In making such a multiplicity of reproductions, one of the Geneva members of the camera, namely, either 46 or 47, could be removed so that the shutter could be operated from the shaft 59, or by hand. It will also be seen that if one of the Geneva members 46 or 47 were removed it would not be necessary to remove the sleeve 97 as the shaft connection could thus operate the shutter 57 without advancing the film 25. After the desired number of reproductions have been made, or after the strip 67 has been used up, the same can be removed by withdrawing the take-up spool 84 and unwinding the same in a dark room and severing the same on the perforated lines so as to be washed whereupon the prints may be stored away in the form of flat sheets.

It is believed that the utility and advantages of the invention will be clear from the foregoing and while I have herein shown and described one specific embodiment of my invention, I do not wish to be limited thereto except for such limitations as the claims may import.

It is apparent that the object of perforating the ribbon having a sensitized surface and moved across the exposure opening of the reproducing camera is to mark on said ribbon the dividing line between the adjacent exposure areas, and therefore perforating is to be understood as comprehending merely marking, and in the claims the latter term is used to designate either.

I claim:—

1. In a reproducing apparatus, the combination of a case having an exposure opening, a removable slide covering the latter and having a supplemental exposure opening controlling the area exposed, means for moving a ribbon having a sensitized surface across said exposure opening of the case, and a removable roller over which said ribbon is drawn by said moving means, such roller being provided with means for marking on said ribbon the dividing line between the adjacent exposed areas.

2. In a reproducing apparatus, the combination of a case having an exposure opening, a removable slide covering the latter and having a supplemental exposure opening controlling the area exposed, reels adapted for winding and unwinding a ribbon having a sensitized surface across said exposure opening of the case, a removable spacing roller disposed relatively to said reels, and means between the reels for guiding said ribbon over said spacing roller, the latter being provided with means for marking on said ribbon the dividing line between the adjacent exposed areas.

3. In a reproducing apparatus, the combination of a case having an exposure opening, a removable slide covering the latter and having a supplemental exposure opening controlling the area exposed, reels adapted for winding and unwinding a ribbon having a sensitized surface across said exposure opening of the case, a removable spacing roller disposed relatively to said reels, means between the reels for guiding said ribbon over said spacing roller, the latter being provided with means for marking on said ribbon the dividing line between the adjacent exposed areas, and means for holding said ribbon tautly on said spacing roller.

4. In an apparatus of the character described, the combination of a projecting camera having means for feeding a ribbon of negative film, a reproducing camera having means for feeding a ribbon of sensitized surface across the exposure opening of said camera in position to receive the image projected from the negative film, and disconnectible means for operating the projecting camera from the reproducing camera.

In testimony whereof I affix my signature in presence of two witnesses.

GEORGE R. WATSON.

Witnesses:
JOHN M. SMITH,
E. H. SMITH.